UNITED STATES PATENT OFFICE.

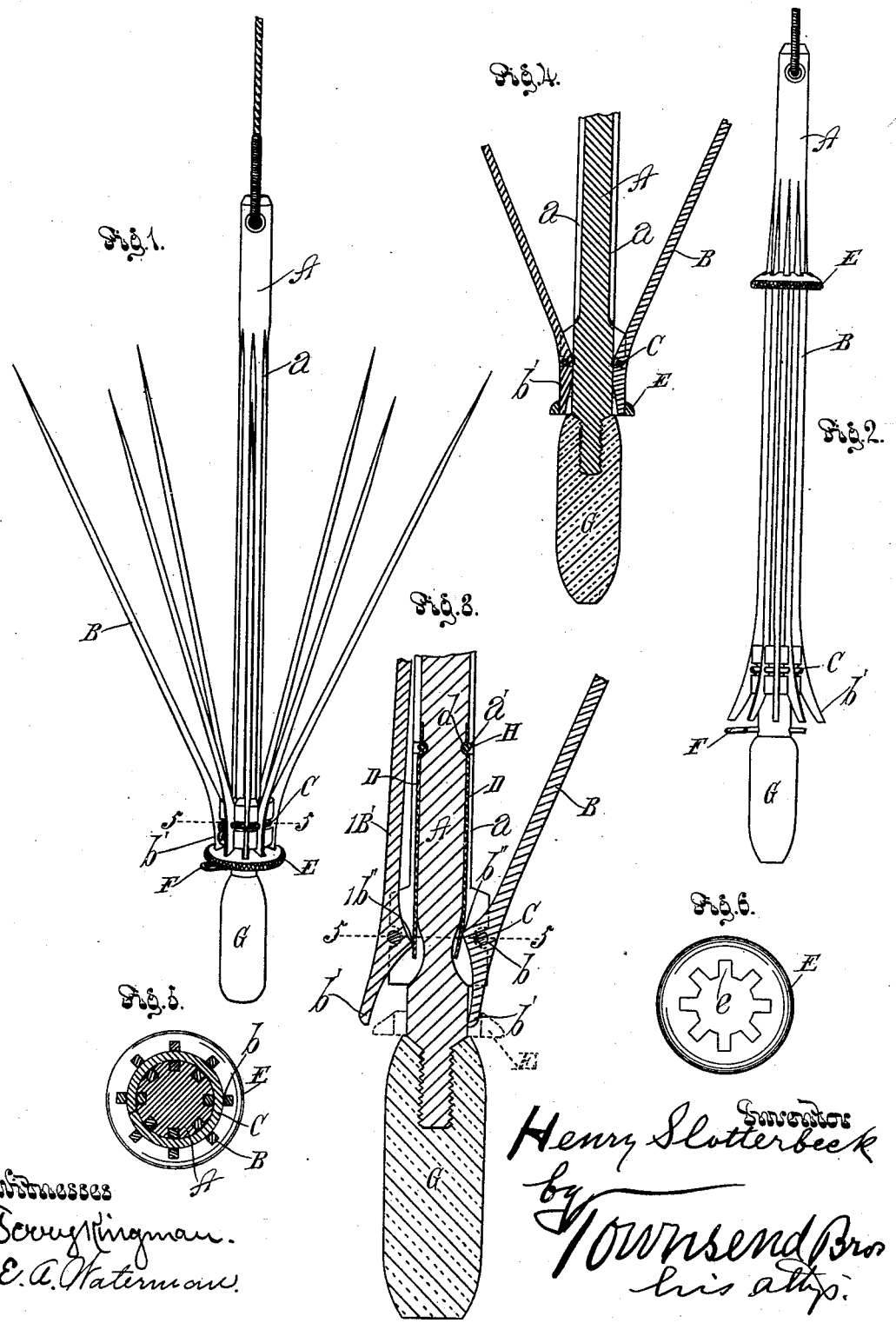

HENRY SLOTTERBECK, OF LOS ANGELES, CALIFORNIA.

FOLDING SNAG-HOOK.

SPECIFICATION forming part of Letters Patent No. 637,169, dated November 14, 1899.

Application filed June 30, 1899. Serial No. 722,474. (No model.)

*To all whom it may concern:*

Be it known that I, HENRY SLOTTERBECK, residing at Los Angeles, in the county of Los Angeles and State of California, have invented a new and useful Folding Snag-Hook, of which the following is a specification.

The object of my invention is to provide a snag-hook which will fold into a very small size and which will be efficient and serviceable when extended for use.

My invention may be embodied in various forms, and in the accompanying drawings I have illustrated several forms.

Figure 1 is a perspective view of my newly-invented snag-hook open ready for use. Fig. 2 shows the snag-hook closed. Fig. 3 is a fragmental mid-section showing the preferred form of the snag-hook. Fig. 4 is a like mid-section showing another form of the snag-hook. Fig. 5 is a section on the line indicated by 5 5, Figs. 1 and 3. This view is slightly different in minor features from both of said views. Fig. 6 is a plan of a ring for holding the tines in their collapsed or extended position, as may be required.

A indicates a stem, which is preferably channeled, as at $a\ a$, there being a channel for each of the tines.

B indicates the tines, pivoted in the respective channels at the lower end of the stem by a pivot C. Said pivot is preferably a ring inserted through holes $b$ in the tines, respectively. The tines project below the pivot, as at $b'$, to engage the stem, and they extend outward and upward from the pivot and are adapted to fold up to bring their points against the stem and to seat said points in the channels, respectively.

Suitable means are provided for retaining the tines in their extended and in their folded positions. These means may be of various kinds, and a hook may be provided with a plurality of such means.

In Fig. 3, D indicates springs, which are seated in the channels $a$ and extend beyond the line of the pivot C, and the channels $a$ are deepened at the pivot, so that the springs can be pressed toward the center of the stem. The tines B are respectively provided with a spring-engaging point $b''$ between the pivot and the stem to engage the springs D, respectively. The point is adapted to press upon the spring with the greatest force at the middle of the movement of the tine from its extended to its folded position, so that when the tine is extended, as shown at B in Fig. 3, the spring will be measurably compressed; but the pressure of the spring upon the point $b''$ will tend to hold the tine in its extended position, and when the tine is folded, as shown at $1^B$ in said Fig. 3, the pressure of the spring against the point $1^{b''}$ will tend to hold the tine in its folded position. In addition to the springs D a ring E is provided as further means for retaining the tines in their extended and in their folded positions. When it is desired to retain the tines in their extended position, the ring will be fitted over the downward-extending portion $b'$ of the tines, thus to positively hold the tines from folding. The ring can be fastened in this position by various means. In Figs. 1 and 2 the pin F is shown for this purpose, and in Fig. 4 the sinker-button G is shown screwed down against the ring E to hold it in place. Dotted lines in Fig. 3 indicate the ring held in position by the sinker-button G, the same as shown in Fig. 4. In Fig. 2 the ring E is shown in position to hold the tines in their folded position.

H indicates a band-wire seated in a notch $a'$ around the stem to hold the springs D in place. The springs D are shown as being bent at $d$ to fit into the notch $a'$, and the band H is fastened in the notches $d$ and the notch $a'$ around the stem, so as to hold the springs against any liability of slipping.

When the snag-hook is to be carried or stored, it will be folded and the ring E placed over the tines B, as indicated in Fig. 2. Then to put the hook into operation the ring E will be taken off of the stem and the tines will be spread out, as shown in Fig. 1, thus bringing the lower projection $b'$ of the tines down against the stem A, thus preventing the tines from spreading out any farther. In the case of the form shown in Fig. 3 the springs will then tend to hold the tines in their extended position. In order to give greater security against accidental folding, the ring E may be placed upon the lower projections of the tines to hold them against the stem. This will be done by removing the sinker G and the pin F, if such a pin has been used, and the ring E will then be passed up over the lower end of the stem A and fitted over the lower ends $b'$ of the tines. Then the pin F, in case it is used, will be inserted beneath the ring to hold the ring in place and the weight or sinker-button G will then be screwed into place; or if this pin is dispensed with the button G will be screwed into place and up against the ring E to prevent it from slipping down off from the lower portions of the tines. When it is desired to fold the hook, the ring will be again removed from the lower portion of the tines and the tines will be folded to bring their points against the stem and into the channels, respectively, and the ring E will be then placed upon the stem and brought down upon the tines. The ring E is notched, as at $e$, to clasp the tines separately.

Now, having described my invention, what I claim as new, and desire to secure by Letters Patent, is—

1. A snag-hook comprising a stem; tines pivoted at the lower end of the stem and projecting outward and upward therefrom and adapted to fold to bring their points against the stem above the pivots.

2. A snag-hook comprising a stem with longitudinal channels therein; tines pivoted in the channels at the lower end of the stem and projecting below the pivot to engage the stem and extending outward and upward from the pivot and adapted to fold to bring their points against the stem.

3. A snag-hook comprising a channeled stem; tines pivoted in the channels at the lower end of the stem and projecting downward therefrom to engage the stem below the pivot and extending upward and outward from the pivot and adapted to fold to bring their points into the channels; and means for retaining the tines in their extended and in their folded positions.

4. A snag-hook comprising a stem; tines pivoted at the lower end of the stem and extending below the pivot to engage the stem and extending outward and upward above the pivot and adapted to bring their points against the stem and each provided with a spring-engaging point between the pivot and the stem; and springs, respectively, to press upon the points to hold the tines in their extended and in their folded positions.

5. A snag-hook comprising a stem; tines pivoted at the lower end of the stem and extending below the pivot to engage the stem and extending outward and upward above the pivot and adapted to fold to bring their points against the stem and each provided with a spring-engaging point between the pivot and the stem; springs respectively to press upon the points to hold the tines in their extended and in their folded positions; and a ring to fit over the tines to hold them in place against the stem.

6. A snag-hook comprising a stem; tines pivoted at the lower end of the stem and extending downward from the pivot to engage the stem and extending upward and outward above the pivot and adapted to fold to bring their points against the stem; a ring to fit over the lower projections of the tines and means to hold the ring in place on the stem.

7. A snag-hook comprising a stem; tines pivoted at the lower end of the stem and extending downward from the pivot to engage the stem and extending upward and outward above the pivot and adapted to fold to bring their points against the stem; a ring to fit over the lower projections of the tines; and a button screwed upon the stem to hold the ring in place.

8. A snag-hook comprising a channeled stem; tines pivoted in the channels of the stem and extending downward from the pivot to engage the stem; and extending upward and outward and adapted to fold to bring their points against the stem; springs seated in the channels and fastened to the stem at the upper ends and extending thence down to engage the tines to yieldingly hold the same in a fixed position.

HENRY SLOTTERBECK.

Witnesses:
JAMES R. TOWNSEND,
F. M. TOWNSEND.